United States Patent [19]

van Dam et al.

[11] 4,140,810

[45] Feb. 20, 1979

[54] FRYING FAT

[75] Inventors: Antonius F. van Dam; Johannes H. M. Rek, both of Vlaardingen, Netherlands

[73] Assignee: Lever Brothers Company, New York, N.Y.

[21] Appl. No.: 835,620

[22] Filed: Sep. 22, 1977

[30] Foreign Application Priority Data

Sep. 24, 1976 [GB] United Kingdom ............... 39817/76

[51] Int. Cl.$^2$ ............................................. A23D 5/00
[52] U.S. Cl. .................................... 426/613; 426/583; 426/589
[58] Field of Search ............... 426/589, 601, 606, 607, 426/613, 583

[56] References Cited

U.S. PATENT DOCUMENTS

| 994,885 | 6/1911 | Sulzberger ....................... 426/589 X |
|---|---|---|
| 3,271,166 | 9/1966 | Van Leeuwen et al. ............ 426/613 |
| 3,982,039 | 9/1976 | Scibelli et al. ....................... 426/583 |
| 4,044,168 | 8/1977 | Steenhoek et al. ............... 426/589 X |

OTHER PUBLICATIONS

Frutton, J. S. "General Biochemistry" John Wiley & Sons, Inc., New York, 1953, p. 128.

*Primary Examiner*—Robert A. Yoncoskie
*Attorney, Agent, or Firm*—Michael J. Kelly; James J. Farrell; Melvin H. Kurtz

[57] ABSTRACT

The invention provides a frying fat containing at least 90% of either liquid, pourable or solid oils and fats and no more than 10% of a mixture of additives including phosphatides and proteinaceous material of an increased proteose-peptone content. Gravies prepared from such a frying fat are more stable against phase separation.

11 Claims, No Drawings

FRYING FAT

The present invention relates to a frying fat which is suitable for frying meat and for preparing gravy of improved stability.

Gravy is usually prepared by frying meat in e.g. margarine or butter and by subsequently mixing the hot liquid ingredients with water. The gravy obtained contains some brown coloured sediment. Similarly gravy can be prepared by frying meat in a frying fat, which — with the object of providing the pleasant brown colour — preferably contains some proteinaceous ingredients and phosphatides but no or no more than some 5% of aqueous ingredients.

Conventional gravies, however, are generally insufficiently stable, which means that the emulsion of essentially fatty and aqueous ingredients will easily separate into two distinct layers.

The frying fat of the invention comprises at least 90% of triglycerides and no more than 10% of a mixture of additives including phosphatides and proteinaceous material, in which proteinaceous material is used of a weight ratio protease-peptone : proteinaceous material of an isoelectric point within the range of pH 4–6 of at least 0.2.

Proteinaceous material is of importance for providing a brown colour to the gravy prepared from the frying fat of the invention and to e.g. meat fried therewith.

The present invention is based upon the surprising observation that the incorporation of an effective amount of proteose-peptone proteins in such frying fats substantially improves the stability of gravies prepared therefrom.

Proteose-peptone is defined by the Committee on Milk Protein Nomenclature, Classification and Methodology of the Manufacturing Section of the American Dairy Science Association, as reported by Dyson Rose et al "Nomenclature of the Proteins of Cow's Milk: Third Revision", Journal of Dairy Science 53, 1–17 (1970), as that proportion of the milk protein system not precipitated by heating at 95° C. to 100° C. for 20 minutes and subsequent acidification to pH 4.7, but precipitated by 12% (weight/volume [W:V]) trichloroacetic acid. The proteose-peptone proteins have been found to account for about 8–25% of the whey- and/or serum proteins and about 2–6% of the total proteins in milk.

In this Specification the term "proteinaceous material of an isoelectric point within the range of pH 4–6" includes non-proteose-peptone proteins of such an isoelectric point and nitrogen containing organic non-proteinaceous material, e.g. urea, peptides, etc. Consequently the percentage of "proteinaceous material of an isoelectric point within the range of pH 4–6" is N × 6.38 minus percentage proteose-peptone, in which N is the percentage nitrogen determined by the Kjeldahl method (Z. Anal. Chem. 22, 366 (1883)).

preferably the frying fat of the present invention contains proteinaceous material of a weight ratio of protease-peptone : proteinaceous material of an isoelectric point within the range of pH 4–6 of at least 0.5, particularly of 0.8–1.2.

Consequently, apart from phosphatides and proteose-peptone proteins, other protein sources can be present as well, e.g. whey powder, skim milk powder, full fat milk powder, buttermilk powder, sodium caseinate etc. The total amount of additives should, however, remain no more than 10% by weight of the frying fat.

Since salts can also favourably influence both taste and stability of the gravy, the mixture of additives may contain one or more salts, preferably in a proportion up to 3% of the frying fat. Ammonium salts, citrates and/or phosphates can be used for the purpose of the invention; common salt (sodium chloride) is, however, preferred.

It has furthermore been observed that some water, e.g. up to 3% by weight of the frying fat may further improve the stability of gravies prepared from the frying fat of the invention, probably since the water assists in finely dispersing the proteinaceous material in the frying fat, as a consequence of which the surface-active properties of the proteins become more evident.

Suitably the total proportion of proteinaceous material in the frying fat of the invention is no more than 5%. The proteose-peptone content is preferably at least 0.01%, particularly from 0.02–0.3% by weight of the frying fat. Phosphatides are preferably present in a proportion of 0.1–1%, the content of triglycerides being preferably at least 95% by weight of the frying fat.

The fat or fat blend to be used for the frying fat of the invention can be liquid, pourable or plastic at ambient temperature, i.e. 20°–25° C.

A suitable liquid oil can for example contain or consist of olive oil, sunflower oil, maize oil, wheatgerm oil, safflower oil etc. or any other oil that is liquid at ambient temperature. A pourable or pumpable fat can e.g. contain the aforementioned liquid oils in admixture with more solid fats, including hardened and fractionated fats. A plastic fat can be butter fat and/or any fat blend that contains hydrogenated, and/or fractionated fats and which in principle is suitable for margarine preparation. Such a fat blend usually has a slip melting point which is at most equal to body temperature.

Especially the frying fat of the present invention contains an additive mixture of 0.2–0.8% of phosphatides, 0.5–2% of salt, 0.5–2% of water, 0.1–4% of proteinaceous material (calculated as dry product). By increasing the proteose-peptone content conventional frying fats, e.g. those disclosed in British patent specification No. 1,023,341, can be improved as well.

Such frying fats can contain fats, phosphatides and, as proteinaceous material, whey powder, either alone or in admixture with one or more other dairy powders.

In such a frying fat the weight ratio of whey powder to milk powder is preferably between 3:1 and 5:1; the whey powder is preferably used in an amount of 0.8–1.2% by weight and the milk powder, especially skim milk powder, in an amount of 0–2% by weight.

Preferably frying fats are prepared comprising cheese whey or concentrated cheese whey (i.e. whey of a solids content within the range of about 10–40%) from which substantial proportions of proteinaceous material of an isoelectric point within the range of pH 4–6 have been removed, so as to increase the weight ratio of proteose-peptone to proteinaceous material of an isoelectric point within the range of pH 4–6 to a value of at least 0.2, preferably at least 0.5, particularly 0.8–12. In this Specification such cheese whey concentrates are indicated as "modified cheese whey concentrates". The types of proteins that have at least partially been removed from cheese whey include for instance various caseins, α-lactalbumin, β-lactoglobulin, serum albumin etc.

In a preferred embodiment of the present invention a frying fat is provided comprising modified cheese whey concentrate of a proteose-peptone content of 1–10%, a salt content of 0–20% and a lactose content of 1–25% by weight of the modified cheese whey. Suitably a modified cheese whey concentrate is obtained by heating cheese whey to 90°–100° C. for about 20–60 minutes, acidifying it to a pH of about 4 to 5, and letting the proteins of an isoelectric point within the range of 4–6 precipitate and centrifuging the coagulated whey proteins. Subsequently the residue is concentrated to a solids content of over 50% and cooled to 5°–25° C. and crystallized lactose is then removed by centrifuging. The supernatant liquid can be used as such, dried or concentrated. Furthermore the salts present and/or milk sugars can be removed, e.g. by electrodialysis, transport depletion, ultra-filtration, reverse osmosis or gel filtration.

In preparing the frying fat of the invention the fat-insoluble ingredients, e.g. proteose-peptone proteins and other proteinaceous material, salts etc. can be added to a fat blend as such, e.g. in the form of a spray-dried mixture or as an aqueous concentrate, provided that thereby the proportion of water is not increased to more than 3% of the frying fat.

The frying fats can be prepared in the manner known per se, by adding to a liquid or melted fatty phase the proteose-peptone proteins and other ingredients, cooling and working the mass e.g. in conventional Votator equipment. If desired, an inert disperse phase, such as gas or up to 3% of an aqueous phase, can be added to the mass before, during or after the cooling. The invention will now be illustrated with reference to the following Examples.

EXAMPLES I–XIII

A mixture of non-fatty ingredients was prepared and slowly added to a melted phosphatide-containing fatty phase consisting of equal parts of palm oil, coconut oil and hardened whale oil of a melting point of 37° C. The mixture was pumped through a cooling cylinder of a Votator and cooled to a temperature of 10 to 20° C., subsequently led through a resting tube of a Votator and finely packed. Several types of proteose-peptone containing products (indicated as product a, b, c, d or e) were used, which consisted of:

product a: modified whey concentrate of a pH of 4.5 and containing 60% water and 40% by weight of solids, i.e. 4% proteose-peptone, 4% non-proteose-peptone proteins of an isoelectric point within the range of 4–6, 12% salts and 20% other solids (essentially lactose).

product b: modified whey concentrate obtained by dialysing and freeze-drying of product a; the composition was: 75% proteose-peptone, 10% nitrogen containing non-proteinaceous material, 1.7% lactose, 0.03% salt and the balance water.

product c: same composition as product a, but pH 5.3.

product d: same composition as product a, but dried by roll-drying.

product e: obtained by electrodialysis and subsequent spray-drying of product a. Product e was composed of 9% proteose-peptone, 14% nitrogen containing non-proteinaceous material, 65% lactose, 5% moisture, about 5% of salts (especially phosphates).

From the frying fats obtained gravies were prepared and the stability thereof was tested.

The gravies were prepared by slowly warming 50 g frying fat to 170° C., and keeping it at that temperature for 1 minute. Subsequently the gravy obtained was quenched with 15 ml tap water and poured in a measuring cylinder of 100 ml.

The time in seconds in which 7½ ml water separated was measured and incidated at T (½).

The compositions of the frying fats prepared and the results of the gravy-test were compiled in Table A.

TABLE A

| Ingredients | I (%) | II (%) | III (%) | IV (%) | V (%) | VI (%) | VII (%) | VIII (%) | IX (%) | X (%) | XI (%) | XII (%) | XIII (%) |
|---|---|---|---|---|---|---|---|---|---|---|---|---|---|
| Whey powder | — | 0.8 | 0.8 | 0.8 | 0.8 | 0.8 | — | — | — | — | — | — | — |
| Skim milk powder | — | 0.2 | 0.2 | 0.2 | 0.2 | 0.2 | — | — | — | — | — | — | — |
| Product a | 2.5 | — | — | — | — | — | 0.5 | 2.5 | 3.33 | — | — | 2.5 | — |
| Product b | — | 0.02 | 0.05 | 0.1 | 0.2 | 0.3 | — | — | — | — | 2.5 | — | — |
| Product c | — | — | — | — | — | — | — | — | — | 1.0 | — | — | — |
| Product d | — | — | — | — | — | — | — | — | — | — | — | — | 1.0 |
| Product e | — | — | — | — | — | — | — | — | — | — | — | — | — |
| NaCl | 1.0 | 1.0 | 1.0 | 1.0 | 1.0 | 1.0 | 1.0 | 1.0 | 1.0 | 1.0 | 1.0 | — | — |
| Soyabean phosphatides | 0.4 | 0.4 | 0.4 | 0.4 | 0.4 | 0.4 | 0.4 | 0.4 | 0.4 | 0.4 | 0.4 | 0.4 | 0.4 |
| Water | — | ≦0.1 | ≦0.1 | ≦0.1 | ≦0.1 | ≦0.1 | 1.7 | 0.5 | — | 2.0 | 0.5 | 0.5 | 2.0 |
| Fat blend | 96.1 | 97.6 | 97.5 | 97.5 | 97.4 | 97.3 | 96.4 | 95.6 | 95.27 | 95.6 | 95.6 | 96.6 | 96.6 |
| T (½) (sec.) | 380 | 190 | 132 | 124 | 180 | 250 | 692 | 420 | 362 | 345 | 586 | 142 | 178 |
| Ratio of proteose peptone to non-proteose peptone protein of isoelectric point within pH 4–6 range (incl-nitrogen containing non-proteinaceous material | 1 | 0.2 | 0.3 | 0.5 | 0.8 | 1.2 | 1 | 1 | 1 | 1 | 1 | 1 | 1 |

We claim:

1. A frying fat composition suitable for the preparation of gravy wherein said gravy has improved phase separation stability, comprising
    (a) at least 90 percent by weight of a triglyceride fat;
    (b) an amount of proteose peptone sufficient to improve the phase separation stability of gravy prepared from said composition, wherein said proteose peptone is present in said composition as a cheese whey derived material with a weight ratio of proteose peptone to proteinaceous material having an isoelectric point of pH 4 to 6 of at least 0.2; and
    (c) 0.1 to 1 percent phosphatides.

2. A composition according to claim 1 wherein said weight ratio is at least 0.5.

3. A composition according to claim 2 wherein said weight ratio is 0.8 to 1.2.

4. A composition according to claim 1 further comprising up to 3 percent by weight of a salt selected from the group consisting of common salt, ammonium salts, citrates and phosphates.

5. A composition according to claim 4 wherein said salt is common salt.

6. A composition according to claim 1 further comprising up to 3 percent by weight water.

7. A composition according to claim 1 wherein said cheese whey derived material is present at a level of no more than 5 percent by weight.

8. A composition according to claim 1 wherein said proteose peptone is present at a level of at least 0.01 percent by weight.

9. A composition according to claim 1 wherein said proteose peptone is present at a level of about 0.02 to 0.3 percent by weight.

10. A composition according to claim 1 wherein said triglyceride fat is present at a level of at least 95 percent by weight.

11. A frying fat composition suitable for the preparation of gravy wherein said gravy has improved phase separation stability, comprising:
 (a) at least 90 percent by weight of a triglyceride fat;
 (b) 0.1 to 4 percent by weight of a cheese whey derived material with a weight ratio of proteose peptone to proteinaceous material having an isoelectric point of pH 4 to 6 of at least 0.2, said proteose peptone being present in said composition at a level of at least 0.01 percent by weight;
 (c) 0.2 to 0.8 percent phosphatides;
 (d) 0.5 to 2 percent salt; and
 (e) 0.5 to 2 percent water.

* * * * *